US005459696A

United States Patent [19]

Dovrat et al.

[11] Patent Number: 5,459,696

[45] Date of Patent: Oct. 17, 1995

[54] ARTILLERY SHELL COUNTER

[75] Inventors: Amikam Dovrat; Moshe Bright, both of Haifa; Gregory Zlotnick, Mitzpe Tal-El, all of Israel

[73] Assignee: State of Israel-Ministry Of Defense Armament Development Authority-Rafael, Haifa, Israel

[21] Appl. No.: 279,387

[22] Filed: Jul. 25, 1994

[30] Foreign Application Priority Data

Aug. 5, 1993 [IL] Israel ........................................ 106606

[51] Int. Cl.[6] ............................... G01S 3/80; F41A 19/01

[52] U.S. Cl. ........................... 367/118; 367/129; 367/124

[58] Field of Search .................................... 367/129, 124, 367/118, 128; 342/139, 357; 364/423; 73/167; 42/1.01, 1.02, 1.03

[56] References Cited

U.S. PATENT DOCUMENTS

| | | | |
|---|---|---|---|
| 3,914,996 | 10/1975 | Davis et al. | 42/1.01 |
| 4,641,138 | 2/1987 | Opitz | 342/61 |

*Primary Examiner*—Daniel T. Pihulic
*Attorney, Agent, or Firm*—Mark M. Friedman

[57] ABSTRACT

A method and system for keeping track of artillery firings of each of a number of artillery pieces, the method including: receiving signals produced by the firings through an array of sensors, such as acoustic sensors; processing the signals to determine which of the number of artillery pieces was the source of the firing; and storing the number of firings of each of the artillery pieces. In alterative embodiments, the method further includes: processing said signals to determine the strength of each of the firings; and storing the strength of the firings of each of the artillery pieces.

15 Claims, 1 Drawing Sheet

ARTILLERY SHELL COUNTER

FIELD AND BACKGROUND OF THE INVENTION

The present invention relates to a method and a system for keeping count of the number of artillery shells fired by an artillery piece and of the amount of charge used.

For several reasons, it is important to keep count, or "keep track", of the number of shells fired by each of several artillery pieces and of the amount of explosive charge used in firing the shells.

One important reason involves inventory control. It is of crucial importance, especially during intense combat, to readily determine, preferably on a real-time basis, exactly how many shells and charge bags have been used so that timely reordering of exhausted supplies can be effected.

Another reason for keeping track of the number and type of firings of an artillery piece is to aid in the maintenance of the piece. For example, the barrels of certain artillery pieces must be refurbished or replaced after a certain number of firings.

There are several ways of counting and keeping track of the number and the strength of the firings of artillery pieces. The simplest involves carefully recording each delivery of shells and charge bags to each gun and periodically taking inventory of, and noting, the remaining stock. While such a method may be suitable in the context of a limited military training exercise or test firing, especially when only a single artillery piece is involved, it is unlikely that such methods can be relied upon in the midst of an intense and often protracted actual artillery battle involving an artillery battery made up of a number of artillery pieces.

Other, more automated, methods for keeping track of gun firings include the use of sensors designed to detect the movement of the barrel of the gun as it recoils after a firing. However, such methods have proven to be unreliable.

There is thus a widely recognized need for, and it would be highly advantageous to have, a simple system for automatically determining the number and strength of firings of individual artillery pieces in a battery.

SUMMARY OF THE INVENTION

According to the present invention there is provided a method for keeping track of artillery firings of each of a number of artillery pieces, comprising: (a) receiving signals produced by the firings through an array of sensors; (b) processing the signals to determine which of the number of artillery pieces was the source of the firing; and (c) storing the number of firings of each of the artillery pieces.

According to further features in preferred embodiments of the invention described below, the method further comprises: (d) processing the signals to determine the strength of each of the firings; and (e) storing the strength of the firings of each of the artillery pieces.

Also according to the present invention, there is provided a system for keeping track of artillery firings of each of a number of artillery pieces, comprising: (a) an array of sensors for receiving signals produced by the firings; (b) a first processing means for processing the signals to determine which of the number of artillery pieces was the source of the firing; and (c) first storage means for storing the number of firings of each of the artillery pieces.

According to further features in preferred embodiments of the invention described below, the system further comprises: (d) a second processing means for processing the signals to determine the strength of each of the firings; and (e) second storage means for storing the strength of the firings of each of the artillery pieces.

According to still further features in the described preferred embodiments, the sensors include acoustic and/or pressure sensors, the processing means include a microprocessor and the storage means include electronic memory.

The present invention successfully addresses the shortcomings of the presently known configurations by providing systems and methods which use an array of sensors to determine the direction from which the firing occurred, thereby identifying the artillery piece which carried out the firing, and the intensity of the firing, which can be associated with the type of projectile fired and/or the strength of the charge used in the firing.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and a system for keeping track of the number and strength of the firings of each of a number of closely located artillery pieces.

The principles and operation of an artillery shell counter and identifier according to the present invention may be better understood with reference to the drawings and the accompanying description.

Figure 1:
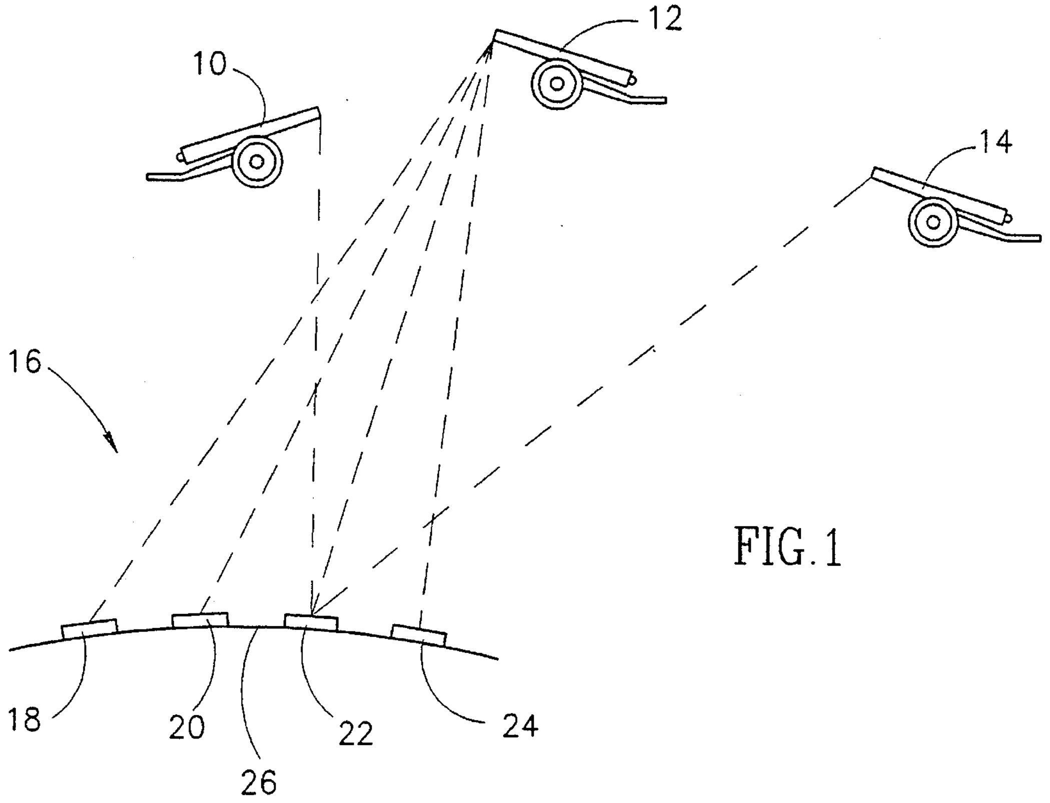
FIG. 1 is a schematic diagram (not to scale) showing a system according to the present invention using four sensors to monitor three artillery pieces.
Figure 2:
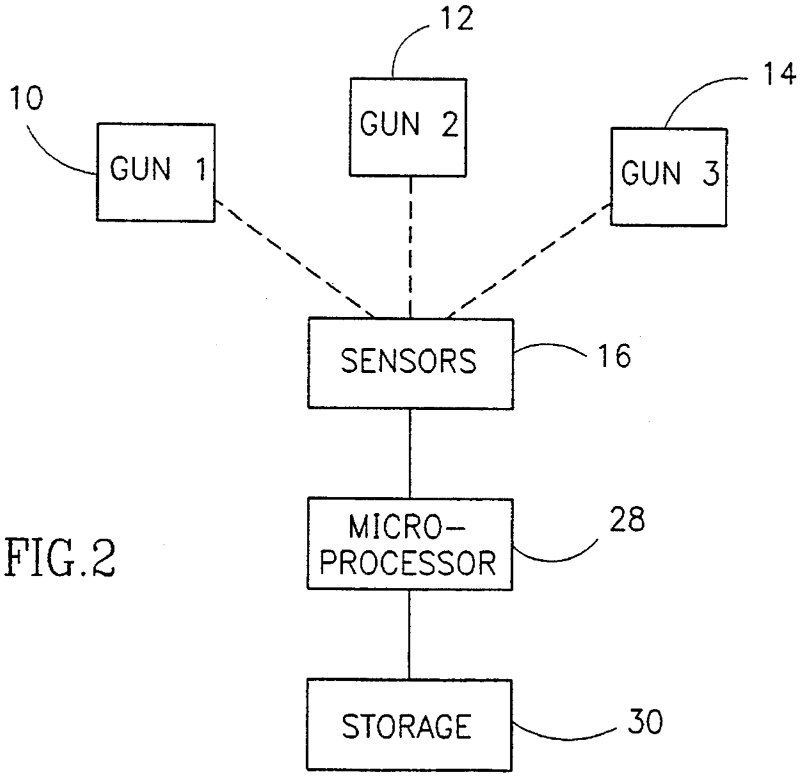
FIG. 2 is a block flow diagram representation of a system and method according to the present invention.

Referring now to the drawings, FIG. 1 (which is not drawn to scale) illustrates an illustrative arrangement of the implementation of a system and method according to the present invention. For illustrative purposes, a battery of three artillery pieces, 10, 12 and 14, is assumed to be deployed as shown in FIG. 1. A different number of artillery pieces could also be used.

Located at some distance from the battery is an array of detectors 16 which is made up of two or more sensors. Four sensors, 18, 20, 22, and 24, are used in FIG. 1 but different numbers of sensors may be used. Sensors 18, 20, 22, and 24, may be of any suitable type, including, but not limited to, pressure sensors or acoustic sensors, i.e., microphones.

Sensors 18, 20, 22, and 24, can be arranged in any suitable manner. Preferably, sensors 18, 20, 22, and 24, are rigidly connected to a frame 26 of suitable size and shape. Any of a large number of configurations may be used, provided that the sensors are at least somewhat separated from each other in location and/or orientation and provided further that, for each of the sensors, the bearing to each of the guns is sufficiently different to allow a determination of the identity of the firing gun. For example, indicated by dotted/dashed lines in FIG. 1 are the directions from sensor 22 to each of the three guns 10, 12 and 14. Also indicated in FIG. 1, by dashed lines, are the paths of the acoustic or pressure signals from gun 12 to each of the four sensors 18, 20, 22, and 24.

A system according to the present invention would operate as follows. Sensors 18, 20, 22, and 24, which are preferably mounted on frame 26, would be placed in the vicinity of battery of guns 10, 12 and 14, preferably behind, and at a safe and convenient distance from, the battery. At some point before, during or after the firing of the guns, the system would be calibrated so as to determine the bearings from the sensors to each of the guns.

As the guns are fired, signals, such as acoustic or pressure signals, from the guns would be received by the sensors. The signals could be stored in some suitable medium, such as electronic memory, for later processing and/or could be processed in real-time, for example, with the aid of a suitable microprocessor 28, to determine which of the artillery pieces was the source of each of the firings. This information would then be stored in some suitable storage medium 30, such as a suitable electronic memory, or similar device. The processing could take any of several forms. For example, coherent processing of the signals from the various sensors could be used to determine the bearing angle at which the signal has its highest amplitude, indicating the direction to the firing gun.

Preferably, the incoming signals would, in addition, be processed to determine, using, for example, the amplitude of the signals, the strength of each of the firings, which can be related to the amount of charge used and/or to the type of projectile fired. This information would also be stored in some suitable medium, such as electronic memory.

While the invention has been described with respect to a limited number of embodiments, it will be appreciated that many variations, modifications and other applications of the invention may be made. For example, it will appreciated that a system and method similar to those described above, with appropriate changes, could be alternatively or additional be used to detect and keep track of incoming shells and other fire, including that of small arms, as well as the approach of land or air vehicles.

What is claimed is:

1. A method for keeping track of artillery firings of each of a number of artillery pieces, comprising:

(a) receiving signals produced by the firings through an array of sensors;

(b) processing said signals to determine which of the number of artillery pieces was the source of the firing; and (c) storing the number of firings of each of the artillery pieces.

2. A method as in claim 1, further comprising:

(d) processing said signals to determine the strength of each of the firings; and (e) storing the strength of the firings of each of the artillery pieces.

3. A method as in claim 1, wherein said sensors include acoustic sensors.

4. A method as in claim 1, wherein said sensors include pressure sensors.

5. A method as in claim 2, wherein said sensors include acoustic sensors.

6. A method as in claim 2, wherein said sensors include pressure sensors.

7. A system for keeping track of artillery firings of each of a number of artillery pieces, comprising:

(a) an array of sensors for receiving signals produced by the firings;

(b) a first processing means for processing said signals to determine which of the number of artillery pieces was the source of the firing; and (c) first storage means for storing the number of firings of each of the artillery pieces.

8. A system as in claim 7, further comprising:

(d) a second processing means for processing said signals to determine the strength of each of the firings; and (e) second storage means for storing the strength of the firings of each of the artillery pieces.

9. A system as in claim 8 wherein said first processing means and said second processing means include a microprocessor.

10. A system as in claim 8 wherein said first storage means and said second storage means include electronic memory.

11. A system as in claim 7, wherein said sensors include acoustic sensors.

12. A system as in claim 7, wherein said sensors include pressure sensors.

13. A system as in claim 8, wherein said sensors include acoustic sensors.

14. A system as in claim 8, wherein said sensors include pressure sensors.

15. A system as in claim 7, wherein said sensors are rigidly connected to a frame of suitable size and shape.

* * * * *